(12) United States Patent
Agarwal et al.

(10) Patent No.: US 8,249,099 B2
(45) Date of Patent: Aug. 21, 2012

(54) EXTERNAL MEMORY DATA MANAGEMENT WITH DATA REGROUPING AND CHANNEL LOOK AHEAD

(75) Inventors: Gaurav Agarwal, Houston, TX (US); John Dowdal, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 174 days.

(21) Appl. No.: 12/548,776

(22) Filed: Aug. 27, 2009

(65) Prior Publication Data

US 2011/0051744 A1   Mar. 3, 2011

(51) Int. Cl.
*G06F 12/08* (2006.01)
*G06F 13/00* (2006.01)

(52) U.S. Cl. ............. 370/465; 711/3; 711/105; 711/118

(58) Field of Classification Search .................. 370/464, 370/465, 469; 710/22; 711/1, 3–5, 104, 711/105, 117–119
See application file for complete search history.

(56) References Cited

U.S. PATENT DOCUMENTS

| | | | |
|---|---|---|---|
| 5,544,342 A * | 8/1996 | Dean ............................. | 711/119 |
| 5,701,516 A | 12/1997 | Cheng et al. | |
| 5,991,851 A * | 11/1999 | Alwais et al. ................ | 711/106 |
| 6,129,458 A | 10/2000 | Waters et al. | |
| 6,978,283 B1 * | 12/2005 | Edwards et al. .............. | 711/170 |
| 7,054,986 B2 | 5/2006 | Zhao et al. | |
| 7,447,876 B2 * | 11/2008 | Senter et al. .................. | 712/205 |
| 7,864,764 B1 * | 1/2011 | Ma et al. ........................ | 370/389 |
| 2003/0004933 A1 * | 1/2003 | Ben-Yehezkel .................... | 707/3 |
| 2003/0112758 A1 * | 6/2003 | Pang et al. ..................... | 370/235 |
| 2005/0021904 A1 * | 1/2005 | Iaculo et al. .................. | 711/103 |
| 2007/0019636 A1 * | 1/2007 | Lau et al. ...................... | 370/360 |
| 2007/0260779 A1 | 11/2007 | Mora et al. | |
| 2007/0271416 A1 * | 11/2007 | Ahmed ......................... | 711/133 |
| 2010/0070742 A1 * | 3/2010 | Dowling ........................ | 712/225 |
| 2010/0153654 A1 * | 6/2010 | Vorbach et al. ............... | 711/137 |
| 2011/0047243 A1 * | 2/2011 | Ramadas ....................... | 709/217 |

OTHER PUBLICATIONS

Delphion Search Results, http://www.delphion.com/fcgi-bin/patsearch, Feb. 23, 2009 (16 pages total).

* cited by examiner

*Primary Examiner* — Kerri Rose
(74) *Attorney, Agent, or Firm* — Steven A. Shaw; W. James Brady; Frederick J. Telecky, Jr.

(57) ABSTRACT

A device manages data for a digital signal processor. The device includes an external random access memory (RAM), configured to store channel specific data for plural different channels; and a microprocessor, in communication with the external RAM. When receiving the packet, in a transport layer processing the packet, the microprocessor determines a channel of the plural different channels corresponding to an indication in a transport layer header of the received packet. The microprocessor fetches channel specific data specific to the channel into an internal memory internal to the microprocessor from the external RAM, by the transport layer, before the packet is passed to an application layer, thereby avoiding a wait for reading the packet at the application layer.

17 Claims, 4 Drawing Sheets

EXTERNAL MEMORY DATA MANAGEMENT WITH DATA REGROUPING AND CHANNEL LOOK AHEAD

TECHNICAL FIELD

The technical field relates in general to memory management in a processor, and more specifically to memory management of data in relation to communication channels.

BACKGROUND

In an embedded processor such as a digital signal processor (DSP), internal memory is costly and precious. Most of the processors have little internal memory, typically barely sufficient for a minimal operating system or critical portion of code that is executed frequently. The internal memory in the DSP is not usual known to the typical user. If an application running on the DSP is processing multiple channels of multimedia, for example voice, video or audio, channel specific buffers typically reside in a memory that is external to the DSP. The data is paged into the internal memory when the application layer processes the channel.

Also, data in the external memory can be accessed through a cache. In a conventional DSP, when a cache miss happens, a cache width worth of data (also referred to as a cache line) is accessed.

SUMMARY

Accordingly, one or more embodiments provide a device for managing data for a digital signal processor. The device includes external random access memory (RAM), configured to store channel specific data for plural different channels; and a microprocessor, in communication with the external RAM. The microprocessor is configured to facilitate: when receiving the packet, in a transport layer processing the packet, determining a channel of the plural different channels corresponding to an indication in a transport layer header of the received packet, and fetching channel specific data specific to the channel into an internal memory internal to the microprocessor from the external RAM, by the transport layer, before the packet is passed to an application layer, thereby avoiding a wait for reading the packet at the application layer.

Another embodiment provides a computer-readable storage medium comprising instructions for execution by a computer, the instructions including a computer-implemented method for managing data for a digital signal processor having external random access memory (RAM) configured to store channel specific data for plural different channels and a microprocessor, in communication with the external RAM. The instructions implement the step of, when receiving the packet, in a transport layer processing the packet, determining a channel of the plural different channels corresponding to an indication in a transport layer header of the received packet. The instructions also implement the step of fetching channel specific data specific to the channel into an internal memory internal to the microprocessor from the external RAM, by the transport layer, before the packet is passed to an application layer, thereby avoiding a wait for reading the packet at the application layer.

Yet another embodiment provides a computer-implemented method for managing data for a digital signal processor having external random access memory (RAM) configured to store channel specific data for plural different channels and a microprocessor, in communication with the external RAM. The method includes, when receiving the packet, in a transport layer processing the packet, determining a channel of the plural different channels corresponding to an indication in a transport layer header of the received packet. The method also includes fetching channel specific data specific to the channel into an internal memory internal to the microprocessor from the external RAM, by the transport layer, before the packet is passed to an application layer, thereby avoiding a wait for reading the packet at the application layer.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
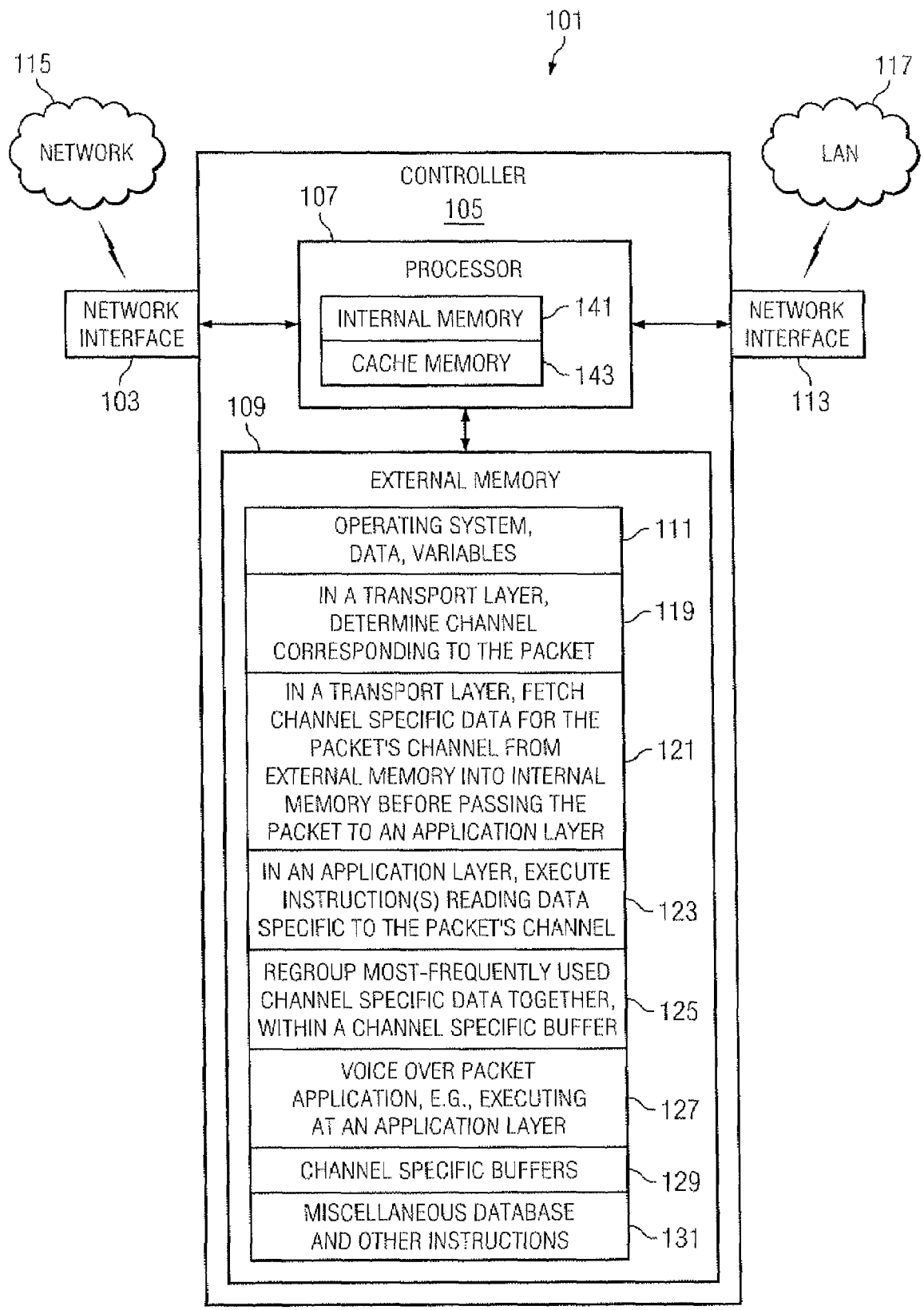
FIG. 1 is a block diagram illustrating portions of a device for managing data for a digital signal processor.

In overview, the present disclosure concerns devices with a processor that has an internal memory and accesses an external memory, typically through a cache. The processor on such devices may be referred to as an embedded processor, embedded microprocessor, digital signal processor, or similar. Such devices may be integrated with other technologies to provide communication network infrastructure devices, communication devices, portable computing devices, and the like, and are sometimes used in connection with services such as wireless or wireline communications, voice over packet (VOP), voice over internet protocol (VoIP), telephone services, wireless or wireline computer networks, and other services. Communications over such devices are conducted using packet communication in connection with channels, and channel specific data is typically stored in a buffer in the external memory. More particularly, various inventive concepts and principles are embodied in systems, devices, and methods therein utilizing an embedded processor accessing the channel specific data in the external memory.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be personnel in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

As further discussed herein below, various inventive principles and combinations thereof are advantageously employed to reduce problems of waiting for data fetches and experiencing cache performance issues in a microprocessor which occur in connection with channel-specific data stored in an external memory.

To explain the data fetching problem, consider one example of the channel is a VOIP channel, which is established on a VOIP gateway. In today's communications, the typical mode of communication is over the Internet using packet communications. Consider the following as an example of the problem. Suppose two applications are communicating over Internet, one is VoIP and one is PSTN (public switched telephone network). The transfer of information between the two different networks is performed by a gateway between the two networks. The point is, when the gateway receives packets, it has many channels open, e.g., for one hundred phones and can receive, e.g., one hundred packets in one second over one hundred open channels. The channel-specific data that will be needed at the application layer cannot be reasonably predicted because the packets arrive asynchronously. Because the channels cannot be predicted, the needed data cannot be predicted.

In conventional processing the packet is received, using conventional packet layered processing. Normally, the application layer is what causes a retrieval of the channel specific data that the application layer needs for processing the data in the packet. The application layer process conventionally then has to wait for the data to be retrieved into the internal memory from the channel specific buffers stored in the external memory, which is explained further in connection with FIG. 8.

Figure 8:
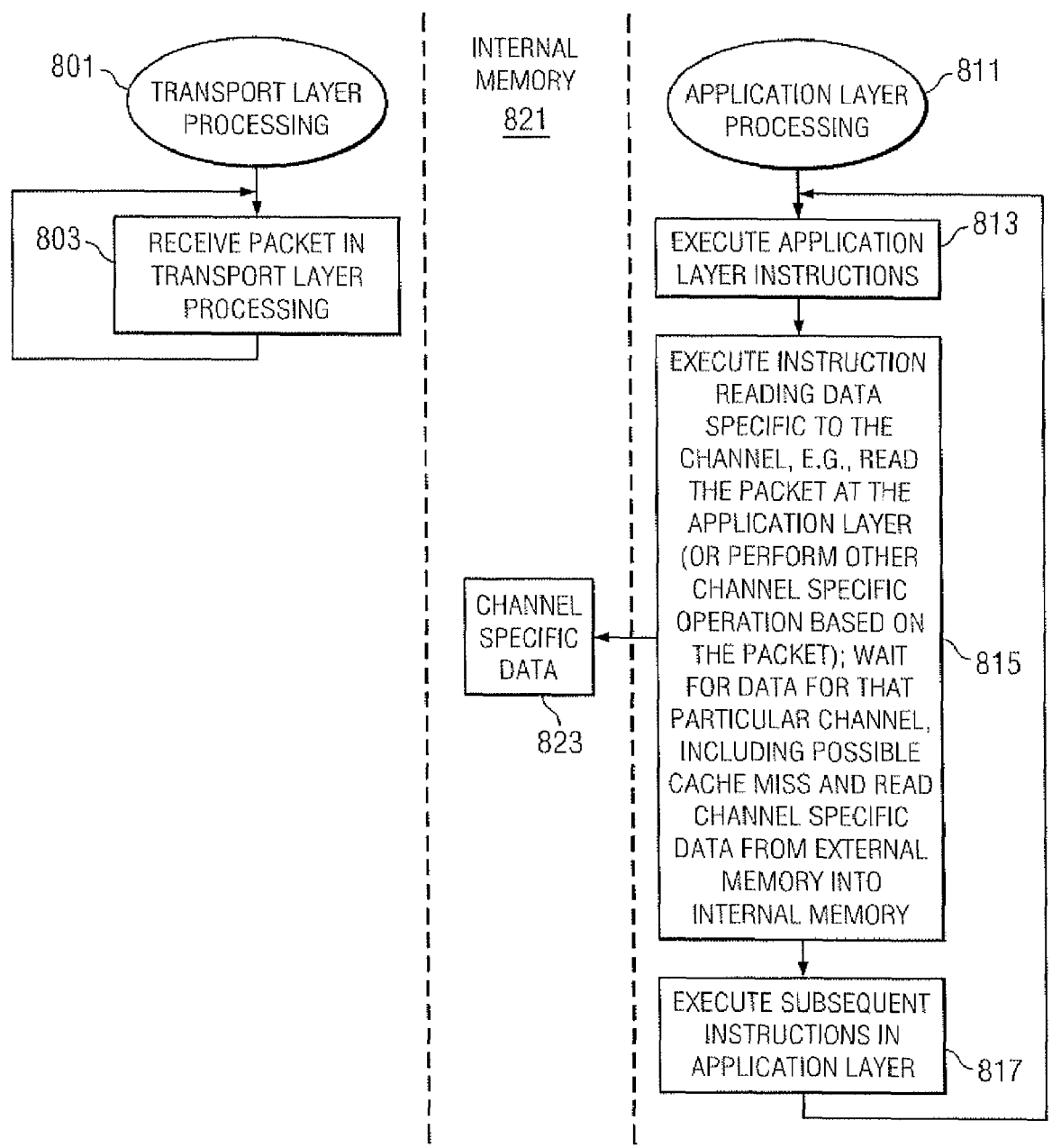
FIG. 8 is a flow chart illustrating a prior art procedure and timing for managing data for a digital signal processor.

Referring now to FIG. 8, a flow chart illustrating a prior art procedure and timing for managing data for a digital signal processor will be discussed and described. It is conventional in the prior art to have a transport layer processing 801 and an application layer processing 811. In the conventional transport layer processing 801, the packet is received 803 and normal transport layer processing is performed. Note that channel specific data 823 is not loaded into the internal memory 821 by the transport layer processing 801. The conventional application layer processing 811 meanwhile executes 813 instructions at the application layer (as will be understood by one of skill in the art). Assuming, for example, that the application is a voice over packet application. The conventional application layer processing 811 will eventually process the received packet received by the transport layer processing 801, provided the packet is destined for the application. For example, the application layer processing executes 815 an instruction(s) causing it to read data specific to the channel 823, such as reading the packet or performing some other channel specific operation based on the packet. As will be understood, the read operation causes the application layer processing to attempt to locate that data that is not yet in an internal memory 821, thereby causing a cache miss further causing the channel specific data 823 to be read from an external memory into an internal memory 821. Consequently, the application layer process' attempt to read data specific to the channel 823 resulted in the application layer processing 821 waiting for the data.

Further in accordance with exemplary embodiments, to improve data fetching, a channel look-ahead can be performed on an embedded microprocessor, for example a digital signal processor (DSP), which communicates with an external memory, for example a RAM memory (e.g., a DDR (double data rate) memory), in which the channel specific buffers are stored. The channel is indirectly specified in the packet header, so a gateway or other device can determine which channel the packet belongs to. Suppose one hundred packets each for different channels are ready to process. When the packet arrives, as soon as the channel for the packet can be determined, the processor in the device fetches data for that channel from the external memory, and thus the processor starts the transfer of data from external memory to internal memory for those particular packets. Therefore, the channel specific data will be in memory before the packet needs to be processed by the application layer. By the time the application layer processes the channel, the data is already in memory and the application layer does not need to wait for the data to be retrieved.

Now consider the additional aspect of the cache performance problem. Recall from the above discussion that the processor is typically an embedded microprocessor with an external memory in which the channel specific buffers are stored. The microprocessor has internal memory which of which the typical user is not aware, but which is known by one of skill in embedded microprocessor memory management. The internal memory is very small compared to the external memory. Internal memory in a typical microprocessor is on the order of 608 kilobytes, although it might be somewhat more or less. This amount of memory is barely enough for an operating system or a critical portion of code that is executed frequently. The external memory is RAM and, in comparison, is several megabytes or gigabytes.

When there is a cache miss caused by a memory access, the processor retrieves one cache line of data from the accessed address. The optimum way to retrieve data into the internal memory is from the external memory through the cache. Although the cache can be disabled, usually the cache is enabled while accessing the external memory. To perform a memory access, the processor first looks in the internal memory; then, if the address is not present in the internal memory, the cache is checked; then, if the address is not in cache (referred to as a "cache miss"), then the cache reads a cache line (for example, 128 bytes, or as defined by the processor architecture) at the address in the external memory.

As an illustration of the cache performance problem, suppose the channel specific buffer for each of the channels is one thousand bytes each, stored in the external memory. Further suppose 80% of the time only two hundred bytes of the one thousand bytes for that channel buffer are used (these numbers are consistent with actual test results). Typically, the frequently used bytes are in physical addresses scattered throughout the channel specific buffer. It should take about eight cache misses to retrieve those two hundred bytes from the one thousand byte channel specific buffer into the cache, even though only two hundred bytes are needed 200 b by the application layer processing.

Further in accordance with exemplary embodiments, a solution to the cache performance problem is to identify those most frequently used bytes and group them so they are all physically adjacent within the channel specific buffer, for example at the beginning (lowest physical address) of the channel specific buffer. Then, accesses to the channel specific data to separately read all of the two hundred bytes result in a total of only two cache misses (in this example, assuming a 128 byte cache line), thereby eliminating six cache misses compared to the usual situation.

Referring now to FIG. 1, a block diagram illustrating portions of a device for managing data for a digital signal processor will be discussed and described. A device for managing data for a digital signal processor 101 may be, for example, a gateway. The device 101 may include and one or more controllers 105. Included in the controller 105 is a processor 107, and an external memory 109. The device 101 can also include various other optional input/output devices such as a liquid crystal display (LCD), a keypad 261, and/or other user interfaces (not illustrated).

The device 101 may be equipped with receivers and transmitters, and/or transceivers, and/or other communication ports, represented here by network interfaces 103, 113. One of the network interfaces 113 can communicate over a wireless or wired connection to a packet network 115, a voice over packet (VOP) network, or a voice over IP (VoIP) network. The second of the network interfaces 113 can communicate over a wireless or wired connection with another network, represented by the illustrated local area network (LAN) 17, for example in connection with Home Plug, HPNA (home phone networking alliance), Bluetooth, and/or other standards. It should be noted that the illustrated plural network interfaces 103, 113, can be configured as a single physical interface in some embodiments. The processor 105 can be connected to the network interfaces 103, 113 using components which are well understood and therefore will not be discussed herein.

The processor 107 may comprise one or more microprocessors and/or one or more digital signal processors. The processor 107 includes an internal memory 141 and a cache memory 143. The internal memory in the processor 107 is a small size, sufficient for an embedded operating system and a critical portion of code which is executed frequently. For example, a typical size of the internal memory 141 is 608 kb. Also included in the processor 107 is a cache memory 143 which functions between the internal memory 141 and the external memory 109 using components that are well understood and are not further discussed herein. Most of the data is stored in the external memory 109 and then accessed through the cache memory 143.

The external memory 109 may be coupled to the processor 107 and may comprise a read-only memory (ROM), a random-access memory (RAM), a programmable ROM (PROM), an electrically erasable read-only memory (EEPROM), and/or a flash memory. The external memory 109 may include multiple memory locations for storing, among other things, an operating system, data and variables 111 for programs executed by the processor 107; computer programs for causing the processor to operate in a transport layer 119, determining a channel corresponding to the packet; in a transport layer 121, fetching channel specific data for the packet's channel from the external memory into the internal memory before passing the packet to an application layer for processing; in an application layer 123, executing instruction(s) reading data specific to packet's channel; regrouping 125 most-frequently used channel specific data together, within a channel specific buffer; a voice over packet (VOP) application 127, for example, executing at an application layer; and/or other processing; channel specific buffers 129 (described below in more detail); and a database 131 for other information used by the processor 107. The computer programs may be stored, for example, in ROM or PROM and may direct the processor 107 in controlling the operation of the device 101. Each of these functions of the computer programs is discussed by way of example below.

The processor 107 may be programmed, in a transport layer 119, to determine a channel corresponding to the packet. Channels communicate to a destination using packets, as is well known. Once a packet is received, it is buffered and then retrieved and processed based on the channel to which the packet belongs. Automatically upon receipt of a communication packet via the network interface 103, 113, the processor 107 commences processing the packet in accordance with layered network processing, which is generally understood to one of skill in the art. Relevant portions of the application layer and the transport layer are described in more detail herein, for example in connection with FIG. 5. The processor 107 may be programmed, in a transport layer 121, to thereafter fetch channel specific data corresponding to the channel that was determined as corresponding to the packet from the external memory into the internal memory before passing the packet to an application layer for processing. The fetch of channel specific data is not performed in a conventional transport layer, but conventionally is caused in response to an application layer attempting to access the channel specific data.

The processor 107 may be programmed, in an application layer 123, to execute instruction(s) reading data specific to the channel corresponding to the packet. Conventionally, the application layer executes an instruction(s) that causes an access to the channel specific data and then must wait for the data to be retrieved from external memory, typically by going into a waiting state. In comparison, the effect of the fetch at the transport layer is that the application layer immediately reads the data specific to the channel which happens to be already fetched into the internal memory 141, instead of going into a waiting state while the data is fetched from the external memory 109 into the internal memory 141. This is described in more detail below.

The processor 107 may be programmed to regroup 125 most-frequently used channel specific data together, within a channel specific buffer 129 in the external memory 109. This is described in more detail below.

The processor 107 may be programmed with a voice over packet (VOP) application 127, for example, executing at or above an application layer or in conjunction with an application layer.

The external memory may be programmed with channel specific buffers 129 (described below in more detail). Many channel specific buffers 129 reside in the external memory 109 in accordance with traditional techniques. Data in one of the channel specific buffers 129 is specific to the application that processes packets received on the channel, since a specific application is associated with a particular channel. When a cache miss happens, a whole cache line worth of data in the channel specific buffer 129 in the external memory is accessed, as is conventional. Because the most frequently used channel specific data is grouped together, the cache miss can bring most of the most frequently-used channel specific data into the cache memory 143 or the internal memory 141 so that subsequent processing on that channel does not have a cache miss.

It should be understood that various logical groupings of functions are described herein. Different realizations may omit one or more of these logical groupings. Likewise, in various realizations, functions may be grouped differently, combined, or augmented. Furthermore, variations can omit functions. For example, a variation of the device 101 can omit the regrouping 125 of the most-frequently used channel specific data. Also, a variation of the device 101 can omit the transport layer fetching 121 of channel specific data. A further variation of device 101 omits the voice over packet application 127 executing at the application layer and/or has a different application executing at the application layer, for example, VOIP (voice over internet protocol) application, PSTN (public switched telephone network) processing, or similar.

Cache performance improvement is discussed in connection with FIG. 2 with a simplified representation of channel specific buffers stored in the external memory, FIG. 3 with one of the channel specific buffers before data regrouping, and FIG. 4 with the one of the channel specific buffers after data regrouping. Because the most frequently used bytes are identified and pre-determined, the pre-determined data can be regrouped together at a specified location (such as the beginning) of the channel, so that the cache misses are reduced. The reduction in cache misses increases available free processor cycles which can be used for other channels, which in turn can be used to increase channel density. Moreover, reducing cache misses can free up cache bandwidth. Before discussing FIG. 2, FIG. 3, and FIG. 4, a description of the data selected for regrouping is provided.

The data that are predetermined to be regrouped together are specific to the application and use-case, for example, VOIP over a gateway (specific application) and a voice-codec (a specific use case for VOIP).

Testing and statistical analysis can be used to select the bytes (about 200-300) that are most frequently used in a predetermined use case for a predetermined application. In the test, the microprocessor is run with the software through multiple use cases, and then the access pattern for the data is observed to determine how many bytes are used and at what addresses they are embedded in the channel specific buffer (in the test case, is one thousand bytes). The information on multiple use cases is recorded, for each of multiple use cases. Then, with all that information, the most used bytes are determined, for example, for 90% of the cases. Typically, after the test it is observed that X bytes (e.g., 200 b in the actual test) cover 90% of the test cases. These are the pre-determined data that are re-grouped together in the channel specific buffer so that the predetermined data are in directly adjacent physical addresses. X is equal to or slightly lower than a multiple of the bytes in the cache line width. For example, if cache line width is 50 bytes, the number of bytes X in the grouping is slightly under a multiple of the cache line width, for example, 190 bytes (which would cause four cache misses) instead of over at 210 bytes for example (which would cause five cache misses and is therefore less advantageous). This approach can be extended to any embedded application, and is especially appropriate for those applications that are performance sensitive. The bytes that benefit from being grouped together depend on the application used in the microprocessor. The data are regrouped within the channel specific buffer preferably before the application begins accessing the channel specific data.

Figure 2:
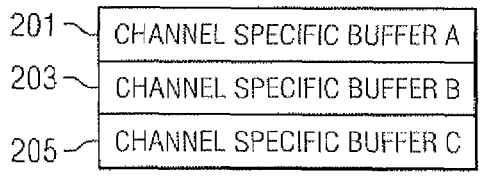
FIG. 2 is a block diagram illustrating channel specific buffers in an external memory.

Referring now to FIG. 2, a block diagram illustrating channel specific buffers in an external memory will be discussed and described. In this simplified representation, the channel specific buffers are channel specific buffer A 201, channel specific buffer B 203, and channel specific buffer C 205. The channel specific buffers are stored in the external memory. Each of the channel specific buffers A-C 201, 203, 205 stores data specific to a particular channel. When a packet is received for the channel, data from the one of the channel specific buffer that corresponds to the channel can be retrieved from the one of the channel specific buffer into cache or internal memory, which are faster memory than the external memory.

Figure 3:
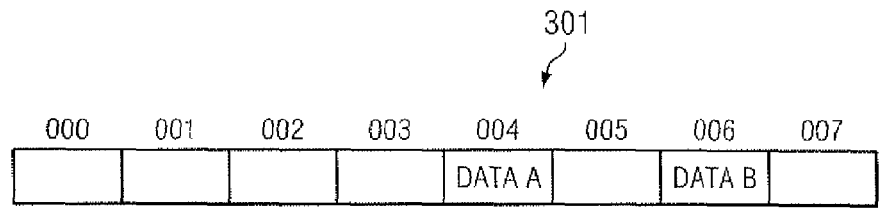
FIG. 3 is a block diagram illustrating channel specific data in a channel specific buffer prior to regrouping.

Referring now to FIG. 3, a block diagram illustrating channel specific data in a channel specific buffer prior to regrouping will be discussed and described. This is one of the channel specific buffers 301 before data regrouping. The channel specific buffer 301 includes data at adjacent physical addresses 000 to 007, the illustrated addresses being a simplified representation although a channel specific buffer is typically about one thousand bytes. The bytes data A and data B are at physically separated addresses 004 and 006 and have been predetermined to be the most frequently used data.

Figure 4:
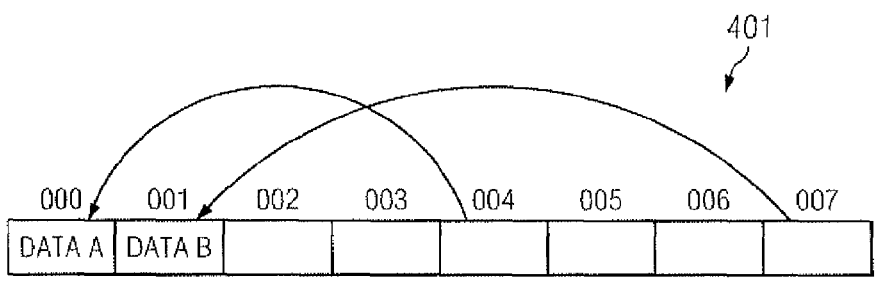
FIG. 4 is a block diagram illustrating channel specific data in a channel specific buffer of FIG. 3 after regrouping.

Referring now to FIG. 4, a block diagram illustrating channel specific data in a channel specific buffer of FIG. 3 after regrouping will be discussed and described. This is the one of the channel specific buffers 401 after data regrouping, and illustrates that the predetermined most frequently used data (bytes data A and data B) are regrouped in a predetermined location 403 within the channel specific buffer 401 so that they are in adjacent physical addresses. In this example, the predetermined location is the beginning of the channel specific buffer 401 starting at address 000, however, the predetermined location can be any other address within the channel specific buffer 401. The most frequently used data may be regrouped before the data is loaded into the channel specific buffer 401, or the data which is initially loaded into the channel specific buffer 401 can be rearranged into the predetermined location 403 after the data is initially loaded.

The other data in the channel specific buffer 401, for example at bytes 000 to 003, 005 and 007 in FIG. 3 can be rearranged in any appropriate manner to the addresses not in the predetermined location 403, for example at bytes 002 to 007 in FIG. 4.

Since each of the channel specific buffers can be specific to a different application calling for different data, the most frequently used data can be different for different channel specific buffers.

The improved data fetching is discussed in connection with FIG. 5 to review layered processing, FIG. 6 to review a relevant transport layer packet field, FIG. 7 to illustrate timing of a combination of the transport layer processing and application layer processing. A comparison of FIG. 7 and FIG. 8 (prior art, previously discussed) can further illustrate the improved data fetching.

Figure 5:
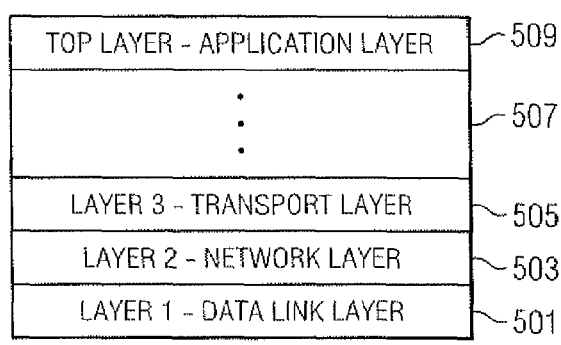
FIG. 5 is a diagram illustrating layered processing.

Referring now to FIG. 5, a diagram illustrating layered processing will be discussed and described. Layered processing used within a packet network is understood to include various layers that can vary depending on the implementation. Generally, even an embedded processor provides a data link layer 501, a network layer 503, a transport layer 505 and an application layer 509. Other layers 507 may be provided below the application layer 509. The functionality of the generally understood layers may be not fully featured in an embedded processor.

The data link layer 501 is well understood in the art and performs data link functions defined in the OS model of computer networking (e.g., ISO 7498 and derivatives, variations and evolutions thereof) and equivalents in other layered computer network models. Generally, the data link layer 501 direct links to other nodes on the network.

The network layer 503 is well understood in the art and performs network layer functions defined in the OSI model of computer networking (e.g., ISO 7498 and derivatives, variations and evolutions thereof) and equivalents in other layered computer network models.

The transport layer 505 performs transport layer functions defined in the OSI model of computer networks (e.g., ISO 7498 and derivatives, variations and evolutions thereof) and is responsible for encapsulating application data blocks into data units (sometimes referred to as datagrams) suitable for communication to the network for transmission to the destination, or managing the reverse transaction by abstracting network datagrams and delivering the data in the packets to the application layer 509. In comparison to the conventional transport layer such as defined in the OSI model of computer networks, the transport layer 505 determines the channel corresponding to the packet and fetches channel specific data for the packet's channel from the external memory into the internal memory before passing processing of the packet to the application layer 509.

The application layer 509 is the layer closest to the end user and/or software application. Some examples of conventional application layer implementations include Hypertext Transfer Protocol (HTTP), File Transfer Protocol (FTP), and Simple Mail Transfer Protocol (SMTP). Because the transport layer 505 is specially programmed to fetch the data specific to the channel, the solution to the data fetching problem can be transparent to the application layer 509 which experiences significantly fewer cache misses.

Figure 6:
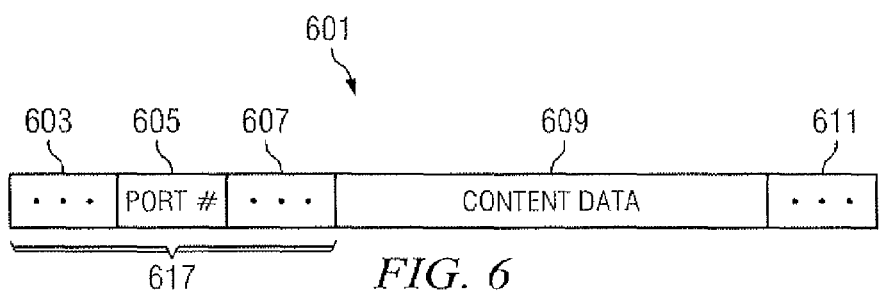
FIG. 6 is a block diagram illustrating portions of a packet.

Referring now to FIG. 6, a block diagram illustrating portions of a packet will be discussed and described. The packet 601 is formatted according to known conventions, to include a packet header 621 with fields specific to the transport layer (referred to herein as "transport layer header field" or "transport layer header fields"), and content data 609. The packet 601 can include known terminating fields 611 such as a check sum field, end of packet field or similar. One of the transport layer header fields is the port number field 605, such as a UDP port number field, which indicates the port number on which the packet is transmitted or received. Because a channel is conventionally is tied to a port, the port number in the port number field 605 of the transport layer header can be used to identify the channel associated with the packet 601. Optionally, other methods can be used to identify the channel associated with the packet.

When the transport layer receives the packet 601, the transport layer can identify the channel from the port number field 605 in the transport layer header 621. Upon identifying the channel, the transport layer can fetch the channel specific data from the external memory into the internal memory. Since the transport layer issues the fetch before the transport layer passes the packet up to the next layer, the fetched data likely will be present in the internal memory by the time the application layer begins processing related to the packet.

Consider, for example, that there are ten packets waiting for processing (each packet from a different channel). As each packet is processed at the transport layer, the transport layer determines the channel number from the transport layer header and issues a request for that data. Hence, the data for all of the ten channels can be loaded already into internal memory before the application layer processing begins for each packet. More particularly, the transport layer requests that the data for that channel (for example, all data from the channel-specific buffer in external memory) be loaded from the external memory into the internal memory, so that it is ready for the application layer processing.

In connection with this read (sometimes referred to as a fetch) at the transport layer, the cache is disabled (sometimes referred to as a cache bypass) for that read. The application layer thereafter can perform a read of the channel specific data, which was already loaded into the internal memory by the transport layer read, and the application layer processing does not enter a wait state because the data is already in internal memory. Moreover, because the data is in internal memory, the application layer processing avoids the conventional need to check other memory, such as cache memory.

It can be advantageous for the data fetch request from the transport layer to be a direct memory access request (that is, a known DMA request to load the channel data from external to internal memory), which frees up cache bandwidth as well. Furthermore, by using a DMA request, the internal memory does not need to increase as much to accommodate increasing numbers of channels—the device can just increase the amount of external data to accommodate more channels.

There can be a predetermined amount of internal memory used for the fetching of data preliminary to the application layer processing. The internal memory can be sized to store the data for, e.g., ten channels. The part of internal memory can be predefined as being dedicated to the preliminary fetching.

Figure 7:
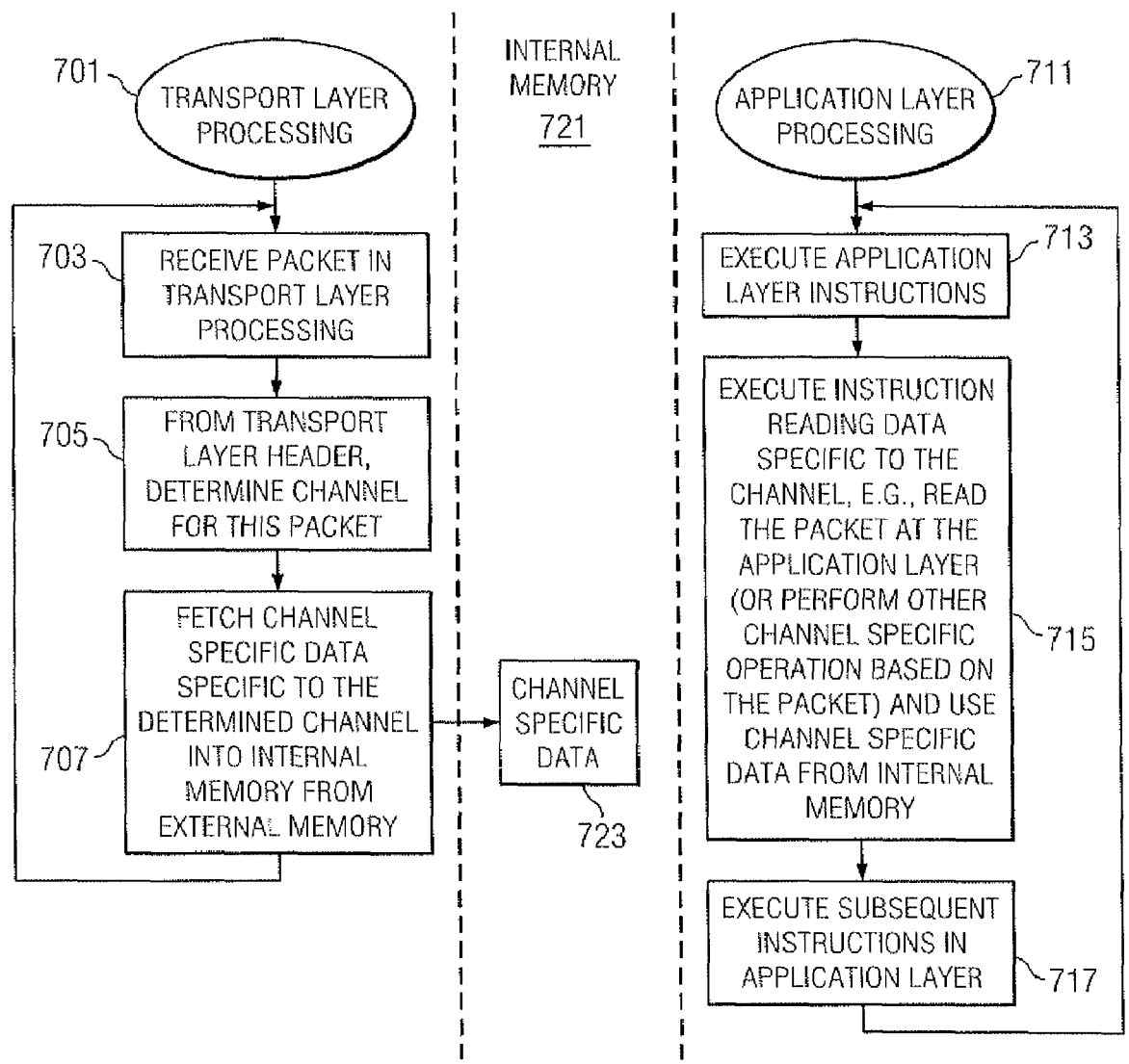
FIG. 7 is a flow chart illustrating a procedure and timing for managing data for a digital signal processor.

Referring now to FIG. 7, a flow chart illustrating a procedure and timing for managing data for a digital signal processor will be discussed and described. The procedure can advantageously be implemented on, for example, a processor of a controller, described in connection with FIG. 1 or other apparatus appropriately arranged. In overview, FIG. 7 illustrates transport layer processing 701, application layer processing 711, and an internal memory 721. The application layer processing 701 functions parallel to the application layer processing 711, although a packet which is received will be first fully processed by the transport layer processing 701 before the application layer processing 711 can process data in the packet, as is known to one of skill in this field.

The transport layer processing 701 provides for receiving 703 a packet in the transport layer processing and performing the usual transport layer processing. The transport layer processing 703 determines 705 the channel for the received packet from the transport layer header, as previously described. The transport layer processing 703 then fetches 707 the channel specific data specific to the determined channel into the internal memory 721 from the external memory which stores channel specific data. The fetch in the transport layer processing 703 causes channel specific data 723 to be loaded into the internal memory 721. The transport layer processing finishes the usual transport layer processing of the packet, and then loops to receive 703 a next packet and repeat the transport layer processing on the next packet.

Meanwhile, the application layer processing 711 provides for executing 713 application layer instructions. One of the instructions executed 715 is an instruction calling for reading the channel specific data, for example, read the data in the packet at the application layer (or to perform some other channel specific operation based on the packet) which calls for the channel specific data. A conventional read instruction will check whether the data is in internal memory 721 before attempting to read the data from the cache or external memory. A read from the external memory will cause the application layer to enter a wait state whilst waiting for the data to load from the external memory. However, finding the channel specific data 723 in the internal memory 721, the read instruction does not enter the wait state and uses the channel specific data from the internal memory 721. The application layer processing 711 can then execute 717 subsequent instruction in the application layer, and can continue processing by executing 713 additional application layer instructions.

Now comparing FIG. 7 to FIG. 8 which is the prior art, it can be seen that FIG. 8 does not fetch the channel specific data at the transport layer processing 801. Instead, the channel specific data 823 is first read into the internal memory 821 when the application layer processing 811 executes 815 an instruction reading the channel specific data. Consequently, the application layer processing 811 will enter a wait state whilst the channel specific data is fetched from the external memory into the internal memory 821.

In comparison, FIG. 7 does not enter a wait state when the application layer processing 711 executes 715 the instruction reading the channel specific data. Even though the application layer processing 711, 811 of FIG. 7 and FIG. 8 can be the same, the transport layer processing 701 results in the process of FIG. 7 being significantly faster than the process of FIG. 8. The process of FIG. 7 can result in less waste of processor cycles. Moreover, the process of FIG. 7 can result in more data being brought into the internal memory just at the right time, allowing for more data to be placed into external memory and also freeing up more bandwidth for the cache.

Testing was performed to analyze the reduced cache misses using the regrouping of most-frequently used data. The test and its results are discussed below.

If the data is in external memory, it is accessed through cache (if the memory area is cacheable). If the data does not exist in the cache, a costly cache misses occurs where (some area of the cache is invalidated and) the required data is brought in from the external memory.

For example, an application has a structure of size 300 bytes in the external memory. In a normal run of the application, say only 30% of the channel specific buffer (~100 bytes) is used. If all these 100 bytes are scattered throughout the channel specific buffer, the whole structure of the channel specific buffer will be accessed. Instead if these 100 bytes are grouped together, only these 100 bytes would be accessed. Take the example on C64x. The cache line size is 128 bytes on C64x cores. If the structure is ungrouped, three cache lines are needed. On the other hand, if the structure is grouped appropriately, most of the time only one cache line (100 bytes) will be accessed, thus saving the penalty of two cache misses.

In high density and medium density voice software (operated on a commercially available C64x+ core), this approach is used to increase the performance. One example is of RCU (RTP Common Module), which was profiled this way and the information was used to regroup the data. By doing this it was found that if RCU data structures are placed in the external memory (as compared to the internal memory), the MIPS impact is very small for TNETV3020 and C268x digital signal processors. Thus more internal memory (which is precious) can be freed up at no extra cost. This paved the way for a 128 channel build on C268x.

Some results from the foregoing test:

Savings: TNETV3020~0.05 MIPS/channel, C266x ~1.5 MIPS/channel
MIPS: Million of Instructions per Seconds. This is a unit to measure how much Micro-Processor/DSP processing is used.
Devices used for this analysis: TNETV3020/TMS320TCI6486, C266x, C268
Application for this analysis: voice over IP implemented on a gateway
Sample output: The list below shows the output of an analysis. The fields marked "Accessed" are the ones that are predetermined to be the most frequently used data for the use case as a result of the analysis.
ID (0) (Accessed) Unique Channel instance ID
state (4) (Accessed) Current state of the channel
sysInst (8) (Accessed) Instance for host out, voice notify, state machine search etc
Unused (12)
Unused (0)
    [0] (0)-(22)
    [1] (0)-(22)
    [2] (0)-(22)
    [3] (0)-(22)
Unused (96)
    rcuSendOut (0) (Accessed) Pointer for send out packets
    targetInst (4) (Accessed) Instance for send out packets
  unused (104)
    ssrc (0) (Accessed) Voice SSRC (Synchronization source) information
    unused (4)
      [0]
      [1]
      [2]
      [3]
    unused (20)
      [0]
      [1]
      [2]
      [3]
    ts (28) (Accessed) timestamp
    clockLastTs (32) (Accessed) Clock value when TS was updated
    seqn (34) (Accessed) Initial/new sequence number
    unused (36)
    unused (38)

-continued

```
    unused (144)
    unused (148)
    dropVoice (152) (Accessed) Number of future voice packets to drop
    stateVars (154) (Accessed) State Variable bitmap
    pkt_flow_mask (156) (Accessed) Bit field indicating packet flow for voice and all four event
spaces
unused (172)
    unused (0)
        [0]unused (0)-(14)
        [1] unused (0)-(14)
        [2] unused (0)-(14)
        [3] unused (0)-(14)
    Unused (64)-(70)
    RxSSRCControl (72) (Accessed) Receive SSRC control (0=reject;1=accept)
    unused (76)
        rcuReceiveOut (0) (Accessed) Receiveout function pointer
        targetInst (4) (Accessed) Receiveout function instance
    ssrc (84) (Accessed) SSRC (Synchronization source) information
    unused (88) -(92)
    stateVars (94) (Accessed) State Variable bitmap
    unused (96) -(106)
    pkt_flow_mask (108) (Accessed) Bit field indicating packet flow for voice and all four event
spaces
    lastRxSeqn (110) (Accessed) Last RTP sequence number
    rtcpCallTable (284) (Accessed) Call table for RTCP module
    rtcpInst (288) (Accessed) Pointer to RTCP instance
    msuInst (292) (Accessed) Pointer to MSU instance
    p2p_ovr_2198 (296) (Accessed) Contains TX and RX payloads for 2833 over 2198 operation
    and RX enable bit
```

As described above, the above fields marked "Accessed" can be grouped together in the channel specific buffer at adjacent physical addresses. For example, the fields ID, state, sysInst rcuSendOut, targetInst, ssrc, ts, clockLastTs, seqn, dropVoice, stateVars, pkt_flow_mask, RxSSRCControl, rcuReceiveOut, targetInst, ssrc, stateVars, pkt_flow_mask, lastRxSeqn, rtcpCallTable, rtcpInst, msuInst, and/or p2p_ovr_2198 (discussed above) can be grouped together, for example beginning at offset 0 within the channel specific buffer for the channel associated with the voice over IP application, for example when the device is a gateway.

Furthermore, the communication networks of interest include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof Such networks can provide wireless communications capability and/or utilize wireline connections such as cable and/or a connector, or similar.

It should be noted that the term network infrastructure device denotes a device or software that receives packets from a communication network, determines a next network point to which the packets should be forwarded toward their destinations, and then forwards the packets on the communication network. Examples of network infrastructure devices include devices and/or software which are sometimes referred to as routers, edge routers, switches, bridges, brouters, gateways, media gateways, centralized media gateways, session border controllers, trunk gateways, call servers, and the like, and variants or evolutions thereof.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A device for managing data for a digital signal processor, comprising:
    external random access memory (RAM), configured to store channel specific data for plural different channels; and
    a microprocessor, in communication with the external RAM through a cache; and
    wherein the microprocessor is configured to facilitate:
    when receiving the packet, in a transport layer processing the packet, determining a channel of the plural different channels corresponding to an indication in a transport layer header of the received packet fetching channel specific data specific to the channel into an internal memory internal to the microprocessor from the external RAM, by the transport layer, before the packet is passed to an application layer, thereby avoiding a wait for reading the packet at the application layer; and regrouping channel specific data within the channel specific buffers to group pre-determined data together, the pre-determined data being pre-determined to be most frequently used by an application, the pre-determined data requiring plural cache lines when ungrouped and requiring fewer cache lines when regrouped.

2. The device of claim 1, the fetching being a direct memory access (DMA) without using the cache between the microprocessor and the external RAM.

3. The device of claim 1, the channel being determined from a predetermined field in the transport layer header.

4. The device of claim 1, the channel being determined as corresponding to a port number field in the transport layer packet header.

5. The device of claim 1, the microprocessor being programmed with the application layer, the application layer including an instruction reading the data specific to the channel, the data specific to the channel being fetched and ready in the internal memory before the application layer executes the instruction reading the data specific to the channel.

6. A device for managing data for a digital signal processor, comprising:
   external random access memory (RAM), configured to store channel specific data for plural different channels; and
   a microprocessor, in communication with the external RAM through a cache
   wherein the microprocessor is configured to facilitate:
      when receiving the packet, in a transport layer processing the packet, determining a channel of the plural different channels corresponding to an indication in a transport layer header of the received packet,
      fetching channel specific data specific to the channel into an internal memory internal to the microprocessor from the external RAM, by the transport layer, before the packet is passed to an application layer, thereby avoiding a wait for reading the packet at the application layer, and
      regrouping channel specific data within the channel specific buffers to group pre-determined data together, the pre-determined data being fields of real time protocol (RTP) specific data structures pre-determined to be most frequently used by a voice over packet application.

7. A computer-readable storage medium comprising instructions for execution by a computer, the instructions including a computer-implemented method for managing data for a digital signal processor having external random access memory (RAM) configured to store channel specific data for plural different channels and a microprocessor, in communication with the external RAM having a cache therebetween, the instructions for implementing the steps of:
   when receiving the packet, in a transport layer processing the packet, determining a channel of the plural different channels corresponding to an indication in a transport layer header of the received packet,
   fetching channel specific data specific to the channel into an internal memory internal to the microprocessor from the external RAM, by the transport layer, before the packet is passed to an application layer, thereby avoiding a wait for reading the packet at the application layer, and
   regrouping channel specific data within the channel specific buffers to group pre-determined data together, the pre-determined data being pre-determined to be most frequently used by an application, the pre-determined data requiring plural cache lines when ungrouped and requiring fewer cache lines when regrouped.

8. The computer-readable storage medium of claim 7, the fetching being a direct memory access (DMA) without using the cache between the microprocessor and the external RAM.

9. The computer-readable storage medium of claim 7, the channel being determined from a predetermined field in the transport layer header.

10. The computer-readable storage medium of claim 7, the channel being determined as corresponding to a port number field in the transport layer packet header.

11. The computer-readable storage medium of claim 7, the microprocessor being programmed with the application layer, the application layer including an instruction reading the data specific to the channel, the data specific to the channel being fetched and ready in the internal memory before the application layer executes the instruction reading the data specific to the channel.

12. A computer-readable storage medium comprising instructions for execution by a computer, the instructions including a computer-implemented method for managing data for a digital signal processor having external random access memory (RAM) configured to store channel specific data for plural different channels and a microprocessor, in communication with the external RAM having a cache therebetween, the instructions for implementing the steps of:
   when receiving the packet, in a transport layer processing the packet, determining a channel of the plural different channels corresponding to an indication in a transport layer header of the received packet, and
   fetching channel specific data specific to the channel into an internal memory internal to the microprocessor from the external RAM, by the transport layer, before the packet is passed to an application layer, thereby avoiding a wait for reading the packet at the application layer, wherein the data in the external RAM is accessed by the microprocessor through a cache, the application program being a voice over packet application, further comprising instructions for:
   regrouping channel specific data within the channel specific buffers to group pre-determined data together, the pre-determined data being fields of real time protocol (RTP) specific data structures pre-determined to be most frequently used by an application.

13. A computer-implemented method for managing data for a digital signal processor having external random access memory (RAM) configured to store channel specific data for plural different channels and a microprocessor, in communication with the external RAM having a cache therebetween, the method comprising:
   when receiving the packet, in a transport layer processing the packet, determining a channel of the plural different channels corresponding to an indication in a transport layer header of the received packet
   accessing the external RAM through the cache;
   fetching channel specific data specific to the channel into an internal memory internal to the microprocessor from the external RAM, by the transport layer, before the packet is passed to an application layer, thereby avoiding a wait for reading the packet at the application layer having a voice over packet application; and
   regrouping channel specific data within the channel specific buffers to group pre-determined data together, the pre-determined data being fields of real time protocol (RTP) specific data structures pre-determined to be most frequently used by an application.

14. The method of claim 13, the fetching being a direct memory access (DMA) without using the cache between the microprocessor and the external RAM.

15. The method of claim 13, the channel being determined from a predetermined field in the transport layer header.

16. The method of claim 13, the channel being determined as corresponding to a port number field in the transport layer packet header.

17. The method of claim 13, the microprocessor being programmed with the application layer, the application layer including an instruction reading the data specific to the channel, the data specific to the channel being fetched and ready in the internal memory before the application layer executes the instruction reading the data specific to the channel.

* * * * *